United States Patent [19]
Jordan

[11] Patent Number: 6,068,294
[45] Date of Patent: May 30, 2000

[54] VERTICAL SEAT LOCKING RETAINER DISK AND TUBE COMBINATION

[75] Inventor: Michael P. Jordan, South Weber, Utah

[73] Assignee: Autoliv ASP, Inc., Ogden, Utah

[21] Appl. No.: 09/084,728

[22] Filed: May 26, 1998

[51] Int. Cl.$^7$ .................................................. B60R 21/26
[52] U.S. Cl. ........................................................ 280/741
[58] Field of Search ............................................. 280/741

[56] References Cited

U.S. PATENT DOCUMENTS

| | | | |
|---|---|---|---|
| 5,253,895 | 10/1993 | Bretfeld et al. | 280/741 |
| 5,454,593 | 10/1995 | Armstrong et al. | 280/741 |
| 5,602,359 | 2/1997 | Hambro et al. | 280/741 |
| 5,639,986 | 6/1997 | Evans | 280/741 |

*Primary Examiner*—Kenneth R. Rice
*Attorney, Agent, or Firm*—Sally J. Brown

[57] ABSTRACT

A positive lock for components of an air bag inflator assembly that includes a first member having a recess formed therein and comprising an ignition tube, a second member comprising a retainer disk, and a retaining means for locking the ignition tube to the retainer disk. The retainer disk has a hollow collar portion with a plurality of indented features formed in the distal end of the collar. At least a portion of the indented features are disposed in the recess in the ignition tube, thereby locking the retainer disk to the ignition tube. The indented features are configured such that upon a force parallel to the longitudinal axis of the ignition tube acting upon the retainer disk, the indented features deform so as to be at least partially disposed in the recess formed in the ignition tube. An inflator assembly for generating gas to rapidly inflate an air bag is also provided that includes a housing defining an interior space therein, an inner side wall with a recess formed therein, and a retainer disk The housing has a top wall, a lower portion, and an outer side wall. The inner side wall comprises an ignition tube that is connected to the lower portion of the housing and has ignition ports formed therein. Ignition tube defines an ignition chamber therein for containing an igniter and a combustion chamber between the inner side wall and the outer side wall for containing a gas generating material. A filter is disposed in the combustion chamber proximate to the interior surface of the outer side wall. The retainer disk is disposed over the inner side wall proximate to the top wall of the housing and has a collar portion that is configured to cooperate with the ignition tube. The collar has indented features formed therein that are at least partially disposed in the recess in the ignition tube, thereby positively locking said retainer disk to said ignition tube.

27 Claims, 6 Drawing Sheets

VERTICAL SEAT LOCKING RETAINER DISK AND TUBE COMBINATION

BACKGROUND OF THE INVENTION

1. The Field of the Invention

The present invention relates to a safety device used particularly in motor vehicles which, upon the onset of a collision, deploys an inflatable restraint cushion, known as an air bag cushion, to protect the occupants of the vehicle from the impact of the collision. More particularly, this invention relates to a positive lock assembly that is utilized in an air bag inflator assembly.

2. The Relevant Technology

An air bag system includes a gas generator commonly known as an inflator assembly. When a motor vehicle, usually an automobile, is involved in a collision, a crash signal actuates the air bag inflator assembly to cause an air bag cushion to deploy. Typically, the actuator triggers a chemical or pyrotechnic reaction in the inflator assembly. In a pyrotechnic-type inflator assembly, gas is produced by the burning of a gas-generating material. The reaction in the air bag inflator assembly produces an inert gas which is directed under pressure into the air bag cushion and forces the air bag cushion into the passenger compartment of the vehicle.

Initially, air bag inflator assemblies included a housing with three distinct chambers within the outside wall thereof. In general, there was an inner wall between the ignition system and the gas generating material and a second wall between the gas generating material and a filter. The gas produced in the inflator was required to flow through ports in both the inner wall and the second wall before exiting the housing through diffusion ports formed in the outside wall into an associated air bag cushion.

Air bag inflator assemblies were improved such that the housings now have an inner side wall and an outer side wall that are concentric. The housing also includes a pair of opposite end walls joined therewith to form a sealed enclosure for containing a solid gas generant material and an ignition system. The inner side wall forms a central ignition chamber that contains the ignition system. The inner side wall has a plurality of ignition ports that are in communication with a combination combustion and filter-containing chamber formed around the ignition chamber. A gas generant material and a filter are disposed in the combustion chamber. The outer side wall of the housing has a plurality of gas discharging, diffuser ports for gas generated in the inflator assembly to rapidly inflate an associated air bag.

Current designs of air bag inflator assemblies include an annular retainer disk that is positioned adjacent to the top wall of the inflator housing and covers the top of the inner side wall to prevent "blow by" of hot gases around the upper and lower end of the filter. In addition, the retainer disk holds the gas generate pellets in a relatively tight cohesive body so that vibrations do not harm the pellets over a long period of time of vehicle use before air bag deployment is required.

Current designs of the retainer disk and an inner side wall require the retainer disk to be to press or force fit over an end of the inner side wall. The inner side wall may comprise an ignition tube. The length of the igniter tube that can be utilized in the press fit assembly of the retainer disk and the igniter tube is limited by the requirement that the igniter tube has ignition apertures formed therethrough that are utilized when igniting the pellets contained in the inflator assembly. As a result, the length of the igniter tube which could be utilized in the press fit between the igniter tube and the retainer disk is small and does not have the strength to resist accidental bumps as well as vibrations. Consequently, with the current design of igniter tubes and retainer disks utilized in the inflator assembly, the connection between the igniter tube and the retainer disk is not particularly strong.

During the manufacturing and assembly process, the retainer disk has demonstrated a tendency to pop off the ignition tube prior to welding the inflator assembly. This is very disruptive to the assembly process, particularly if the gas generation material has been disposed in the inflator assembly. A spill of the gas generation material may even present a dangerous situation. In addition, accidental separation of the ignition tube and the retainer disk during the life of the air bag impedes the effectiveness of the inflator assembly.

Attempts have been made to resolve the current problems resulting from the accidental separation of the igniter disk and the ignition tube. One proposed solution to the problem was to crimp the retainer disk around the ignition tube. Crimping, however, requires exerting a non-vertical force, using such equipment as a non-vertical press head, to apply radial force to the retainer disk to obtain a positive or mechanical lock between the igniter tube and the retainer disk. The application of radial force requires expensive tooling and the addition of unconventional assembly procedures to the assembly process.

SUMMARY AND OBJECTS OF THE INVENTION

It is, therefore, an object of the present invention to positively lock a retainer disk over the end of an inner side wall of an inflator assembly such that the retainer disk will remain in place even when the inflator assembly in an air bag system is rotated or vibrated during the assembly process or the life of the air bag.

It is another object of the present invention to provide an improved air bag inflator assembly, and more particularly, a retainer disk which is mechanically locked to an ignition tube.

It is another object of the present invention to provide an inflator assembly as part of an air bag system that has a retainer disk positively attached to the ignition tube, without increasing the number of steps during the assembly process.

Another object of the present invention is to provide an inflator assembly with a retainer disk mechanically locked over the end of the ignition tube without requiring additional tooling or the application of radial force during the assembly process.

A further object of the present invention is to provide a low cost retainer disk that can be mechanically locked to the end of the ignition tube in one step.

Yet another object of the invention is to provide a new and improved air bag inflator assembly which is low in cost and efficient in operation.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a positive lock for components of an air bag inflator assembly is provided that includes a first member, a second member with a hollow collar portion formed therein, and a retaining means for positively locking said first member to said second member. The retaining means includes a recess formed in the first member and indented features formed in the collar portion of the second member. At least a portion of each of the indented features is disposed in the recess in the first member, thereby locking the second member to the first member. The first member comprises an elongated ignition tube, and the second member comprises a retainer disk. The indented features are configured such that upon a force parallel to the longitudinal axis of the ignition tube being applied the retainer disk, the indented features deform so as to be at least partially disposed in the recess formed in the ignition tube.

An inflator assembly for generating gas to rapidly inflate an air bag cushion is also provided that includes a housing defining an interior space therein, an inner side wall, a retainer disk, and a retaining means for positively locking the retainer disk to the inner side wall. The housing has a top wall, a lower portion, and an outer side wall with a plurality of ports formed therein.

The inner side wall comprises an ignition tube that is connected to the lower portion of the housing and is substantially concentric with the outer side wall. The ignition tube defines an ignition chamber therein for containing an igniter and a combustion chamber between the ignition tube and the outer side wall for containing a quantity of gas generating material. The ignition tube has a plurality of ignition ports formed therein. A filter is disposed in the combustion chamber proximate to the interior surface of the outer side wall. The filter is configured to entrap the combustion residue from the gas generated in the housing before discharge of the gas. The retainer disk is disposed over the ignition tube proximate to the top wall of the housing. The retainer disk has a hollow collar portion formed therein that is configured to cooperate with one end of the ignition tube.

The retaining means comprises a recess formed in the ignition tube and a plurality of indented features formed in the collar portion. At least a portion of each of the indented features is disposed in the recess in the ignition tube, thereby locking said retainer disk to said ignition tube.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to an inflator assembly for an air bag system that includes a retainer disk and an ignition tube which are configured to be mechanically locked together to eliminate any accidental separation thereof during the assembly process or during the life of the air bag system.

Figure 1:
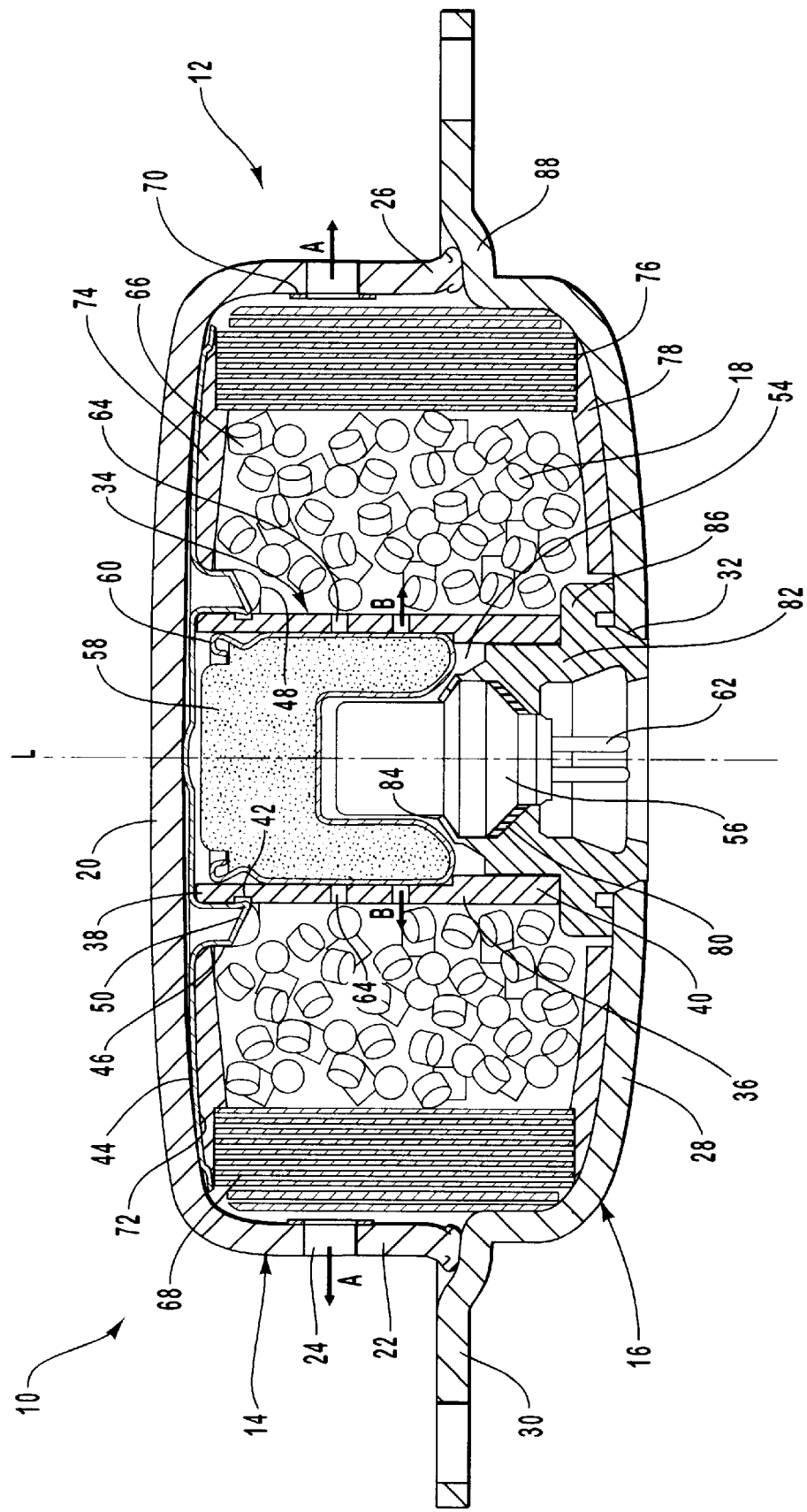
FIG. 1 is an enlarged cross-sectional elevation view of one embodiment of an air bag inflator assembly.

One embodiment of an inflator assembly for rapidly inflating an air bag cushion upon actuation is shown generally in FIG. 1 by the reference numeral 10. Inflator assembly 10 includes a housing or canister 12. One embodiment of housing 12 comprises a diffuser cover 14 and a base 16. Diffuser cover 14 and base 16 are joined to form a sealed enclosure for containing a quantity of gas generating material, such as by way of example and not limitation, a solid, gas generant material 18 depicted in FIG. 1 in the form of pellets. Gas generant material 18 is capable of rapid combustion to provide a necessary volume of gas for inflating an air bag cushion (not shown) in communication with inflator assembly 10 after being actuated.

Diffuser cover 14 comprises a top wall 20 and a downwardly depending, outer side wall 22. As depicted, outer side wall 22 is integral with top wall 20. Outer side wall 22 could, however, be attached to top wall 20 using convenient methods of attachment and fasteners, including but not limited to, welds, screws and bolts, and perform the function thereof with equal effectiveness. Diffuser cover 14 is substantially cup-shaped and forms the upper portion of housing 12. Diffuser cover 14 may have various cross-sectional configurations such as oval, elliptical, round, rectangular, or square, for example, or any variation of these shapes. One embodiment of diffuser cover 14 illustrated in FIG. 1 is substantially round. What is important is that diffuser cover 14 and base 16 be configured to cooperated and to form a sealed enclosure. Outer side wall 22 of diffuser cover 14 is provided with a plurality of gas discharge ports 24 arranged around outer side wall 22 for directing the gas generated in housing 12 outwardly into an air bag cushion (not shown) as indicated in FIG. 1 by arrows A. Housing 12 may be formed of metal such as aluminum or steel sheet or plate material.

As previously discussed, base 16 is configured to cooperate with remote end 26 of outer side wall 22. Base 16 comprises a lower portion 28 and a mounting flange 30. Base 16 and diffuser cover 14 are configured to define an interior space therein. Consequently, the cross-sectional configuration of lower portion 28 of base 16 and diffuser cover 14 are substantially the same. Accordingly, as illustrated, lower portion 28 of base 16 is substantially round. Lower portion 28 of base 16 has a central opening 32 formed therein.

Mounting flange 30 of base 16 extends substantially radially outward from lower portion 28. Mounting flange 30 is used to mount inflator assembly 10 of an air bag system in a motor vehicle. As depicted, mounting flange 30 is integrally formed with lower portion 28. Mounting flange 30 could, however, be attached to either lower portion 28 of base 16 or remote end 26 of diffuser cover 14 by conventional fasteners or attaching methods such as, by way of example, screws, bolts, or welds. It can be appreciated that mounting flange 30 may have various configurations. In the embodiment illustrated in FIG. 1, mounting flange 30 is square.

Inflator assembly 10 also comprises a centrally disposed, inner side wall 34 within housing 12 that is concentric with outer side wall 22. One embodiment of inner side wall 34 comprises an ignition tube 36 that is elongated and tubular in shape with a longitudinal axis L. As most clearly shown in FIG. 2, ignition tube 36 has an upper end 38 and a lower end 40. Ignition tube 36 is substantially cylindrical. Inflator assembly 10 also includes a retainer disk 44. Retainer disk 44 is formed so has to have a hollow collar portion 46 that extends toward ignition tube 36 and is adapted to receive upper end 38 of ignition tube 36 therein. Collar portion 46 has a distal end 48.

Figure 2:
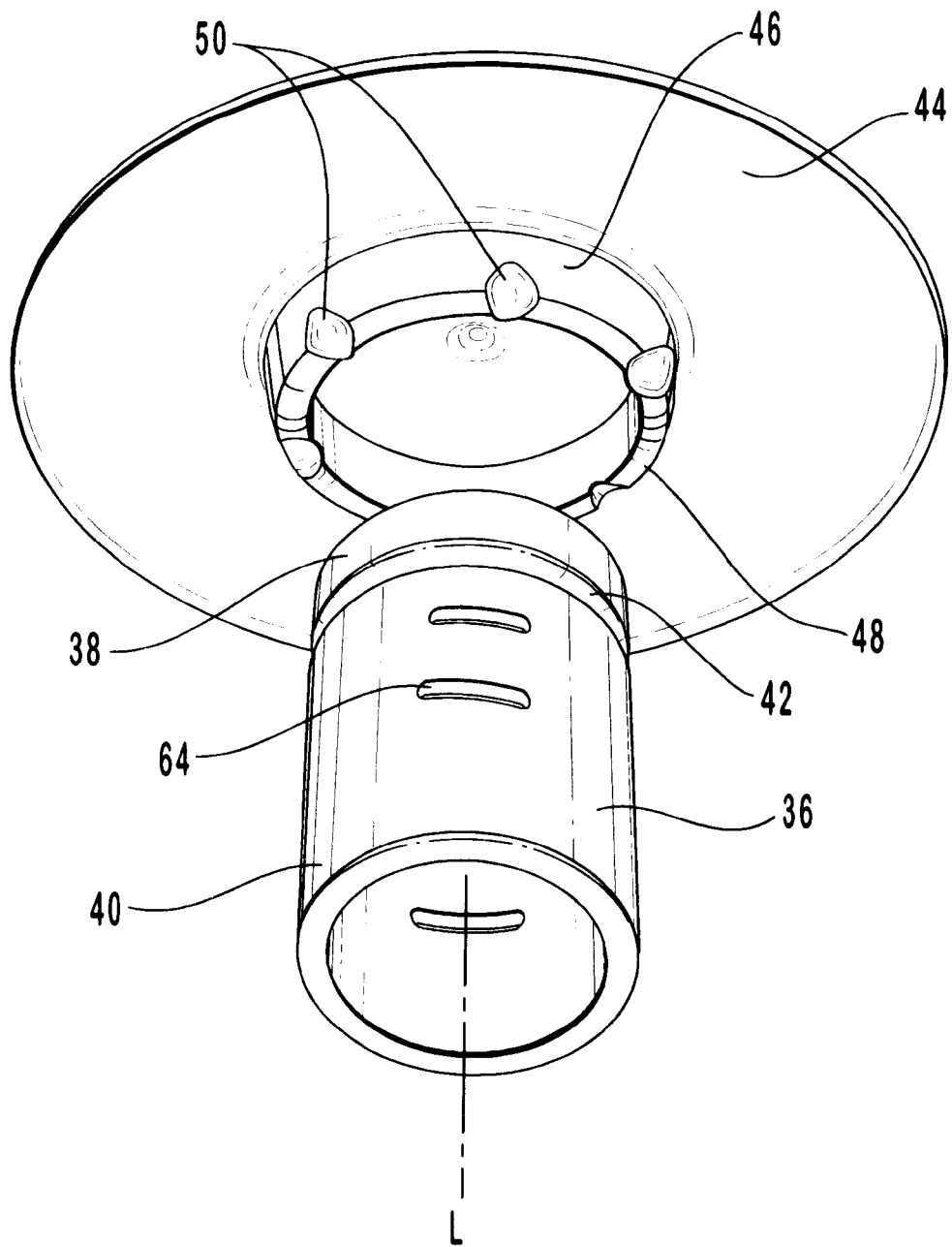
FIG. 2 is an enlarged, exploded perspective view of one embodiment of the retainer disk and the ignition tube from the inflator assembly of FIG. 1.
Figure 3:
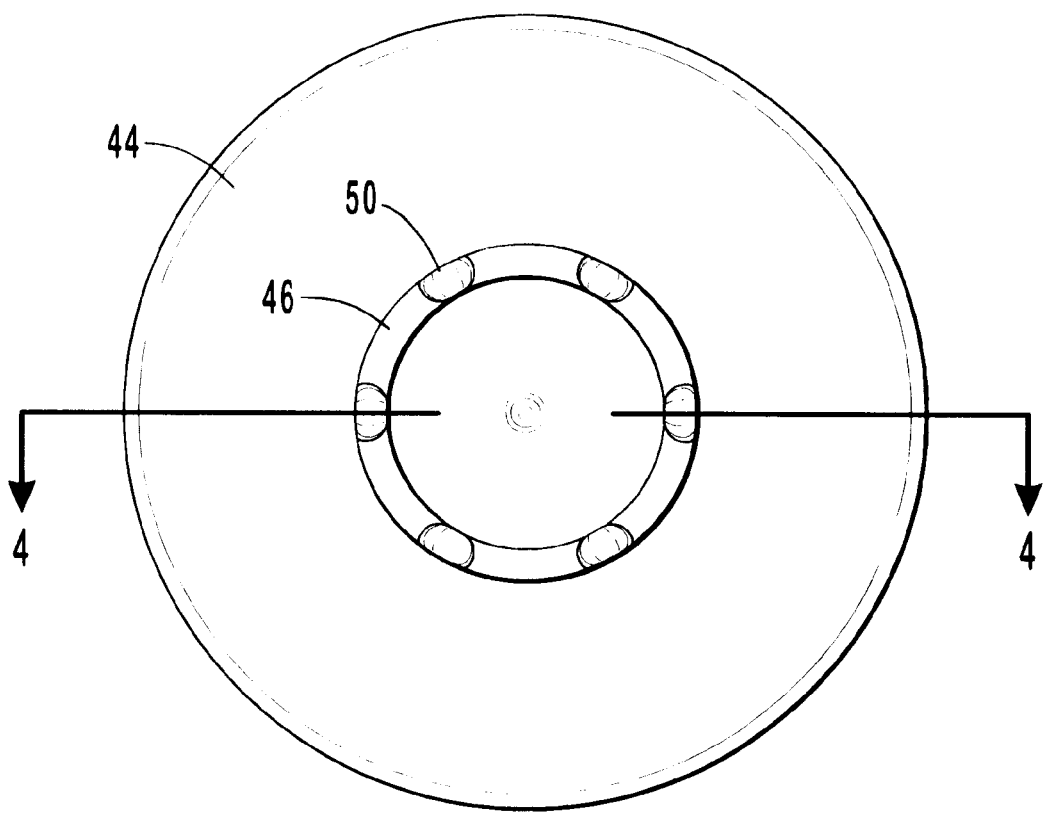
FIG. 3 is an elevation view of the retainer disk of FIG. 2.
Figure 4:
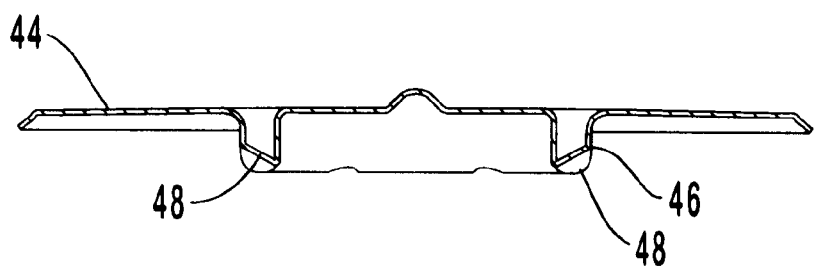
FIG. 4 is a cross-sectional elevation view of the retainer disk of FIG. 3 taken along the section line 4—4 therein.

According to another aspect of the present invention, inflator assembly 10 comprises a retaining means for positively locking retainer disk 44 to upper end 38 of ignition tube 36. One possible embodiment of structure performing the function of such a retaining means, as shown in FIGS. 2 and 3, by way of example and not limitation, comprises indented features 50 formed in distal end 48 of collar portion 46 and recess 42 formed in the outside surface of ignition tube 36. Indented features 50 are substantially evenly spaced around collar portion 46. Retainer disk 44 depicted in FIG. 3 has six indented features 50 formed in distal end 48 of collar portion 46. It can be appreciated by those skilled in the art that various other arrangements and/or numbers of indented features 50 are equally effective in performing the intended function thereof.

Figure 5:
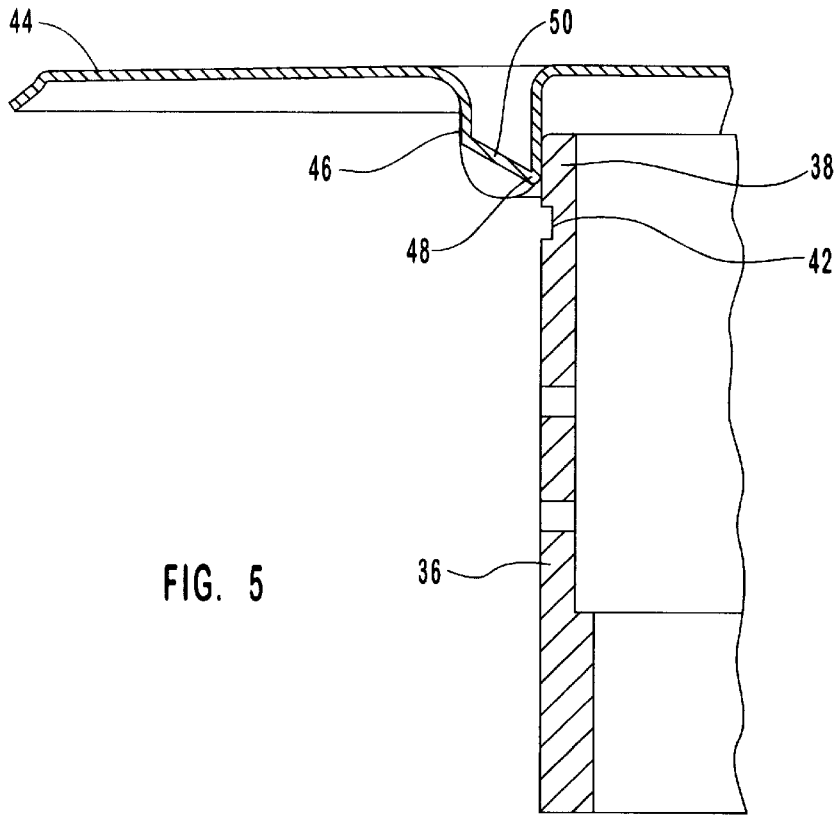
FIG. 5 is a partial cross-sectional elevation view of the retainer disk and ignition tube of FIG. 2 prior to being assembled.

Indented features 50 are angled relative to the longitudinal axis L of ignition tube 36. Indented features 50 are configured such that distal end 48 of collar portion 46 at indented features 50 is proximate to ignition tube 36 as depicted in FIG. 5. Indented features 50 may have various angles and perform the function thereof equally effectively. Indented features 50 will be discussed in further detail below.

In the embodiment illustrated in FIG. 1, recess 42 is a channel or groove formed around the outside surface of ignition tube 36. Recess 42 is depicted as being continuous. It is not necessary, however, that recess 42 be continuous. Recess 42 is also shown as being substantially rectangular or square shaped. Recess 42 may have various other geometric configurations and perform the function thereof equally effectively. The purpose of recess 42 will be discussed in more detail below.

Inner side wall 34 formed by ignition tube 36 forms a centrally disposed ignition chamber 54 for containing an ignition squib 56 and a charge 58 of an ignition-enhancing material contained within an igniter cup 60 that is positioned proximate to upper end 38 of ignition tube 36. Ignition squib 56 is electrically activated and includes a pair of electrical terminals 62 for connection to an electrical activation system of a motor vehicle.

Inner side wall 34 formed by ignition tube 36 and outer side wall 22 of cover 14 define a combustion chamber 66. In one embodiment illustrated in FIG. 1, combustion chamber 66 is annular. An annular filter 68 is mounted adjacent the inside surface of outer side wall 22. Combustion chamber 66 and filter 68 are configured to cooperate. Combustion chamber 66 and filter 68 may have other configurations and perform the function thereof with equal effectiveness as long as combustion chamber 66 and filter 68 cooperate. A quantity of solid gas generation material 18 is disposed in combustion chamber 66 between filter 68 and ignition tube 36.

Ignition tube 36 has a plurality of ignition ports 64 in direct communication between the ignition chamber 54 and surrounding combustion chamber 66. Ignition ports 64 in ignition tube 36 direct hot combustion products from ignition squib 56 and charge 58 into solid gas generation material 18. The flow of the hot combustion products from ignition chamber 54 to combustion chamber 66 is indicated in FIG. 1 by arrows B.

A variety of filters 68 may be utilized in inflator assembly 10. In general, filter 68 is cylindrically-shaped and has an inner face with a large surface area for receiving hot combustion products generated in the housing 12. The outer surface of filter 68 is proximate to gas discharge ports 24 in outer side wall 22. Gas discharge ports 24 are sealed against the entry of contaminants during the life of inflator assembly 10 by a thin foil sealing tape 70. It is preferred that sealing tape 70 comprise an aluminum sealing tape. Sealing tape 70 is readily ruptured by the gas pressure created by activating inflator assembly 10 to fill an associated air bag cushion (not shown).

Filter 68 has an upper lateral end 72 and a lower lateral end 76. Upper lateral end 72 of filter 68 is at least partially contacting a first damper pad 74. As depicted in FIG. 1, first damper pad 74 is disposed in compression chamber against retainer disk 44 to contact upper lateral end 72 of filter 68 and solid gas generation material 18. A second damper pad 78 is disposed against the inside surface of lower portion 28 of base 16 and lower lateral end 76 of filter 68. Solid gas generation material 18 also contacts second damper pad 78.

A squib adapter plug 82 holds and supports ignition squib 56. Squib adaptor plug 82 is disposed in opening 32 and closes the lower end of ignition chamber 54. It is preferred that squib adaptor plug 82 be comprises of a metal material. A seal 80 is disposed between ignition squib 56 and squib adapter plug 82. Ignition squib 56 is secured to squib adapter plug 82 by crimping an upper end portion 84 of squib adaptor plug 82 against the upper surface of ignition squib 56 as depicted in FIG. 1. Squib adapter plug 82 includes an outwardly extending, radial flange 86 which is supported by inside surface of lower portion 28 of base 16. Radial flange 86 supports lower end 40 of ignition tube 36. Squib adaptor plug 82 is fixedly attached to lower portion 28 of base 16 by conventional attachment methods such as welding or using conventional fasteners.

The assembly process for inflator assembly 10 includes disposing squib adaptor plug 82 in opening 32 of lower portion 28 of base 16. In the embodiment illustrated in FIG. 1, squib adaptor plug 82 is disposed in opening 32 of lower portion 28 and held in place by a weld such as a projection weld. Seal 80 is attached to ignition squib 56 and both seal 80 and ignition squib 56 are disposed in the opening formed by upper end portion 84 of squib adaptor plug 82. Upper end portion 84 of squib adaptor plug 82 is crimped over ignition squib 56 to hold squib 56 firmly in place relative to lower portion 28 of base 16.

Second damper pad 78 is disposed against the inside surface of lower portion 28. Filter 68 is then mounted in lower portion 28 of base 16 with lower lateral end 76 of filter 68 at least partially disposed against second damper pad 78. Ignition tube 36 is then positioned such that lower end 40 of ignition tube 36 abuts radial flange 86 of squib adaptor plug 82. Ignition tube 36 forms inner side wall 34 which separates ignition chamber 54 from combustion chamber 66. Solid gas generation material 18 can be then disposed in combustion chamber 66 between the inside surface of filter 68 and the outside surface of ignition tube 36.

Igniter cup 60 containing charge 58 is disposed in ignition chamber 54 as depicted in FIG. 1. First damper pad 74 is placed over solid gas generation material 18 and contacts at least a portion of upper lateral end 72 of filter 68.

Figure 6:
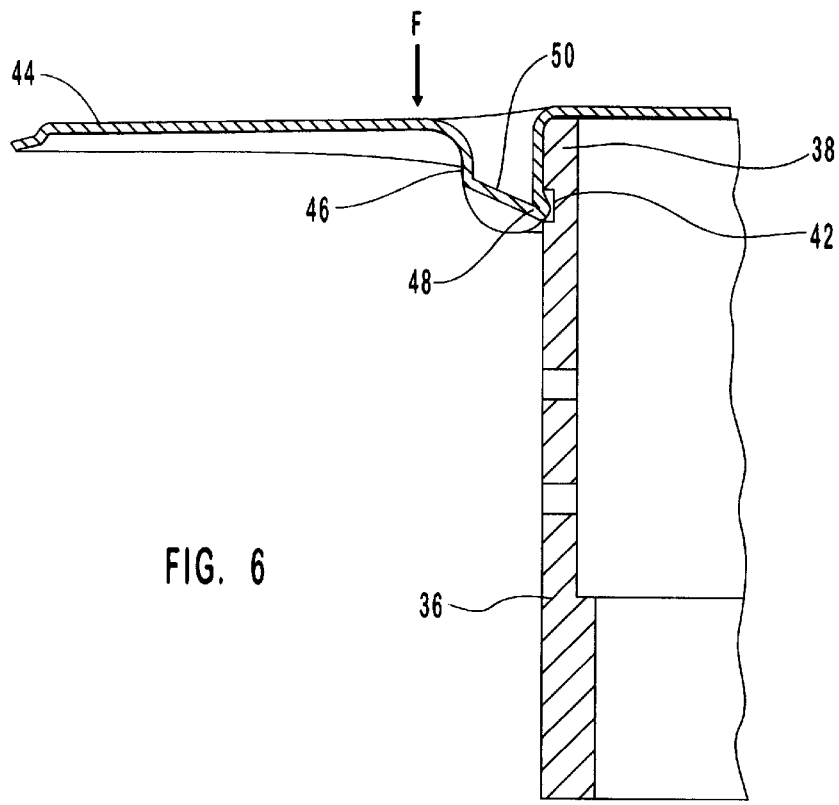
FIG. 6 is a partial cross-sectional elevation view of the structure of FIG. 5 with the retainer disk positively locked to the ignition tube.

Retainer disk 44 is positioned over upper end 38 of ignition tube 36 such that upper end 38 of ignition tube 36 will be received within collar portion 46 of retainer disk 44 as depicted in FIGS. 5 and 6. The novel configuration of retainer disk 44 with collar portion 46 allows upper end 38 of ignition tube 36 to be positively and mechanically locked to retainer disk 44 as will be discussed in more detail.

Once upper end 38 of ignition tube 36 is disposed within collar portion 46, a force substantially parallel to the longitudinal axis L of ignition tube 36 and indicated by arrow F is applied to the outside surface of retainer disk 44. The force is applied to the portion of retainer disk 44 outside collar portion 46 and causes indented features 50 to rotate and deform toward ignition tube 36. The deformation of indented features 50 due to the force F being exerted on retainer disk 44 causes a portion of distal end 48 of collar portion 46 at indented feature 50 to be disposed in recess 42 and positively locks retainer disk 44 on upper end 38 of ignition tube 36.

One way to exert such a force on retainer disk 44 is to use a press machine, such as by way of example and not limitation, a vertical press head. This novel design of retainer disk 44 and ignition tube 36 with recess 42 formed therein eliminates the need for additional tooling or non-vertical press head action configured to apply a radial force to obtain a positive lock. The use of retainer disk 44 with collar portion 46 that has a plurality of indented features 50 formed therein and a cooperating recess 42 formed in ignition tube 36 greatly facilitates the rapid assembly of the air bag inflator assembly 10. In addition, eliminating the possibility of accidental separation of retainer disk 44 and ignition tube 36 increases the effectiveness of inflator assembly 10 because retainer disk 44 reduces flow of hot gases around upper lateral end 72 and lower lateral end 76 of filter 68 which ensures good filter action by containing the gas flow. In addition, gas generation material 18 is securely retained in combustion chamber 60.

Cover 14 with aluminum foil sealing tape 70 covering gas discharge ports 24 is attached to base 16. Mounting flange 30 includes a contoured portion 88 adapted to receive remote end 26 of outer side wall 22 of cover 14. Cover 14 is attached to base 16 using conventional attachment methods. In one embodiment depicted in FIG. 1, remote end of side wall 22 is welded to base using an interia welding process and forms an airtight enclosure.

Figure 7:
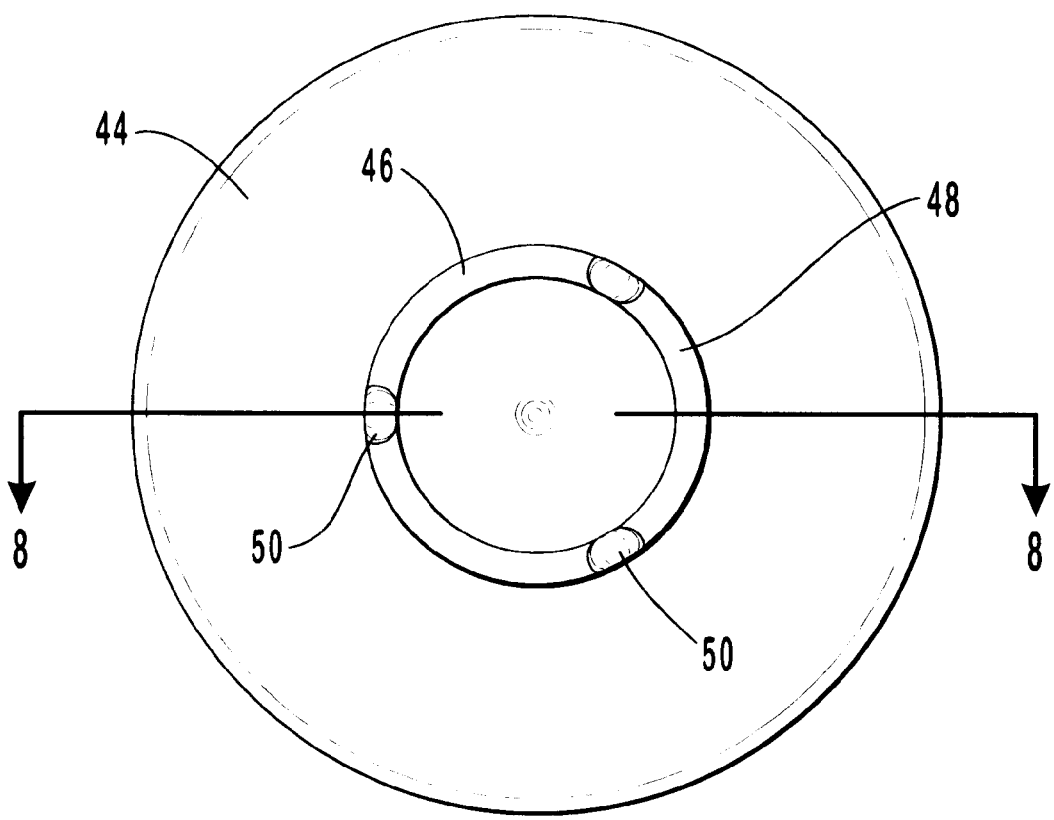
FIG. 7 is an elevation view of another embodiment of a retainer disk.
Figure 8:
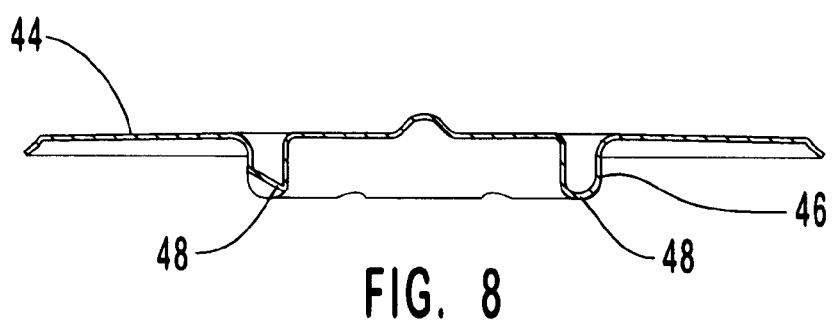
FIG. 8 is a cross-sectional elevation view of the retainer disk of FIG. 7 taken along the section line 8—8 therein.
Figure 9:
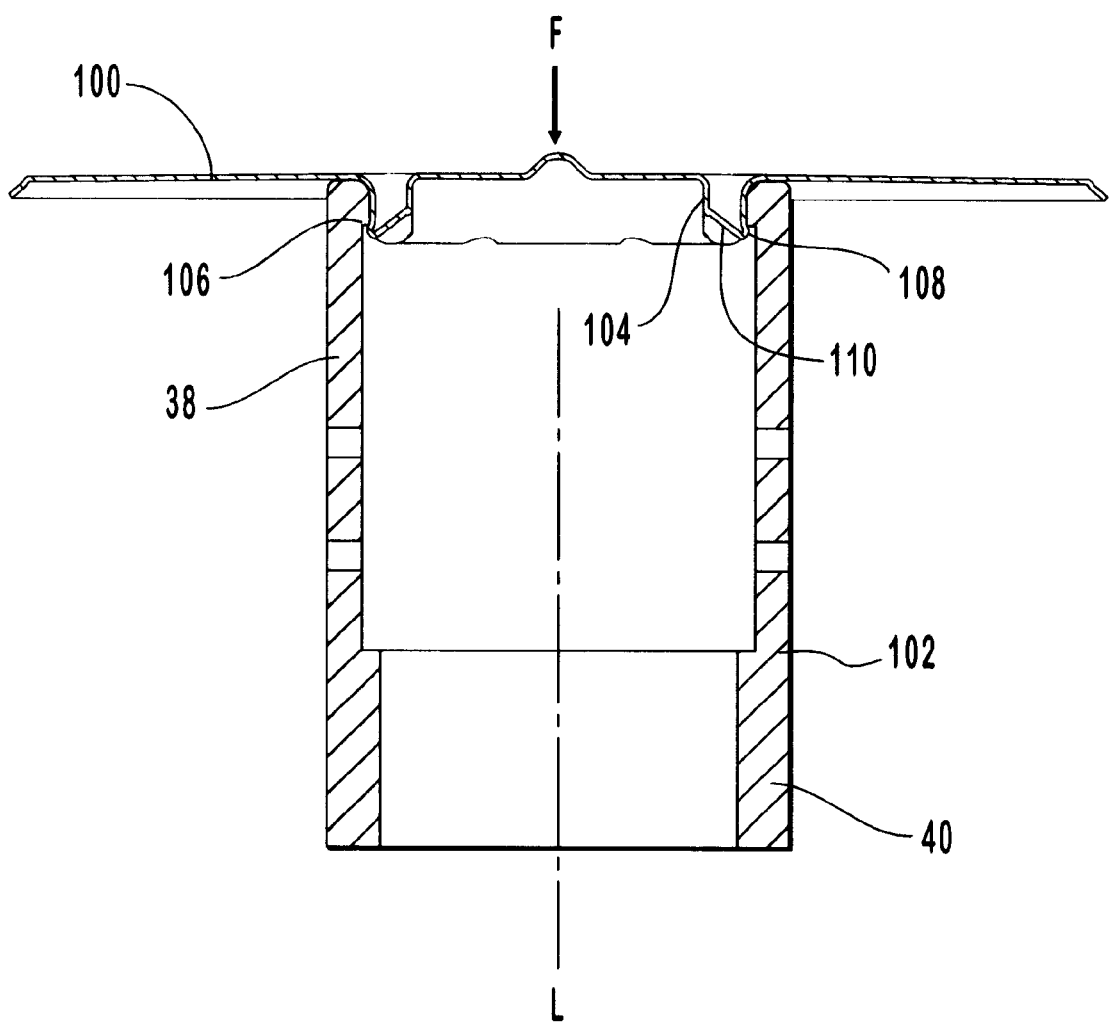
FIG. 9 is a cross-sectional elevation view of an alternate embodiment of a retainer disk locked to an alternate embodiment of an ignition tube.

FIGS. 7 and 8 illustrate alternate embodiments of retainer disk 44. FIG. 9 illustrates an alternate embodiment of both retainer disk 44 and ignition tube 36. The majority of features previously discussed apply to these alternate embodiments. The features that are not effected are identified with the same reference numbers as used in FIGS. 1–6. Only those features that have changed will be described in detail.

FIGS. 7 and 8 depict retainer disk 44 with collar portion 46. Distal end 48 of collar portion 46 has an alternate arrangement of indented features 50. As previously discussed, various arrangements and numbers of indented features 50 may be utilized without affecting the intended function thereof. There must, however, be a sufficient number of indented features 50 to lock retainer disk 44 to upper end 38 of ignition tube 36 with sufficient strength to resist the forces acting on retainer disk 44 and tending to separate retainer disk 44 from upper end 38 of ignition tube 36.

FIG. 9 illustrates an alternate embodiment of a retainer disk 100 and an ignition tube 102. As depicted, retainer disk 100 has a collar portion 104 that is now received within upper end 38 of ignition tube 102. The interior surface of ignition tube 102 has a step 106 which defines a recess 108 to receive at least a portion of indented features 110 located in distal end 48 of collar portion 104 after force F has been applied to retainer disk 100. Indented features 110 are angled relative to longitudinal axis L of ignition tube 102. In this embodiment, indented features 110 are a mirror image of the angular position of indented features 50 which were disposed in recess 42 formed in the outside surface of ignition tube 36. In other words, distal end 48 of collar portion 104 at indented features 110 is proximate to the inside surface of ignition tube 102.

In this embodiment, upon force F which is parallel to the longitudinal axis L of ignition tube 102 being exerted on the center portion of retainer disk 100, indented features 110 rotate and deform outwardly so that at least a portion of distal end 48 of collar portion 104 at indented features 110 is disposed in recess 108 defined by step 106. It can be appreciated that step 106 defining recess 108 and recess 42 illustrated in FIGS. 1–2 and 5–6 are interchangeable and can be used with either configuration of a collar portion of a retainer disk or an igniter tube with a recess formed therein.

It can be appreciated that inflator assembly can be assembled in numerous variations of the steps previously discussed. The sequence of the steps can be rearranged and be equally effective.

It can also be appreciated by those skilled in the art that the inventive lock assembly disclosed herein relative to an air bag inflator has broad applications. It is contemplated that the lock assembly may be utilized in a variety of applications where a first member is to be permanently attached to a second member utilizing a non-radial one directional force.

The present invention may be embodied in other specific forms without departing from its spirit or essential characteristics. The described embodiments arc to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for mechanically locking components of an air bag system comprising the steps:

(a) positioning a second member having a hollow collar portion formed therein over an end of a first member, said collar being configured to cooperate with said end of said first member;

(b) exerting a force substantially parallel to the longitudinal axis of said first member upon said second member; and (c) deforming an indented feature formed in said collar portion such that at least said indented feature is at least partially disposed in a recess formed in said first member, thereby positively locking said first member and said second member.

2. A method for mechanically locking components of an air bag system as recited in claim 1, further comprising the step rotating said indented feature.

3. A method for mechanically locking components of an air bag system as recited in claim 1, wherein said first member is an ignition tube.

4. A method for mechanically locking components of an air bag system as recited in claim 1, wherein said second member is a retainer disk.

5. A positive lock assembly for components of an air bag inflator assembly comprising:
   (a) a first member having a longitudinal axis, an inside surface, and an outside surface;
   (b) a second member having a hollow collar portion formed therein configured to cooperate with said first member;
   (c) a retaining means for positively locking said first member to said second member;
   (d) a recess formed in said inside surface of said first member; and
   (e) a plurality of indented features formed in said collar portion of said second member, at least a portion of each of said plurality of indented features being disposed in said recess in said first member, thereby positively locking said second member to said first member.

6. A positive lock assembly as recited in claim 5, wherein said recess is defined by a step in the surface of said first member.

7. A positive lock assembly as recited in claim 5, wherein said recess is defined by a step formed in said ignition tube.

8. A positive lock assembly as recited in claim 5, wherein said recess is a channel.

9. A positive lock assembly as recited in claim 5, wherein said plurality of indented features are configured such that upon a force parallel to the longitudinal axis of said first member being applied to said retainer disk, said plurality of indented features deform so that at least a portion of each of said plurality of indented features is disposed in said recess formed in said first member.

10. A positive lock assembly as recited in claim 5, wherein each of said plurality of indented features are at an angle relative to the longitudinal axis of said first member such that the remote distal end of said collar portion at each of said plurality of indented features is proximate to said first member.

11. A positive lock assembly as recited in claim 5, wherein said collar portion is sized and configured to receive said first member therein.

12. A positive lock assembly as recited in claim 5, wherein said collar portion is sized and configured to be received within said first member.

13. A positive lock for components of an air bag inflator assembly comprising:
   (a) an elongated ignition tube having an upper end;
   (b) a retainer disk having a hollow collar portion formed therein, said collar portion having a distal end and being configured to receive said upper end of said ignition tube therein;
   (c) a recess formed in said ignition tube; and
   (d) an indented feature formed on said distal end of said collar, said indented feature being at least partially disposed in said recess upon a force parallel to the longitudinal axis of said ignition tube being applied to said retainer disk, thereby locking said retainer disk to said ignition tube.

14. A positive lock for components of an air bag inflator assembly as recited in claim 13, further comprising a plurality of indented features.

15. A positive lock for components of an air bag inflator assembly as recited in claim 14, wherein said plurality of indented features are at an angle relative to the longitudinal axis of said ignition tube such that the distal end of said collar portion at said plurality of indented features is proximate to said ignition tube.

16. A positive lock for components of an air bag inflator assembly as recited in claim 13, where in said recess is formed in the outside surface of said ignition tube.

17. A positive lock for components of an air bag inflator assembly as recited in claim 13, wherein said recess is a channel.

18. An inflator assembly for generating gas to rapidly inflate an air bag, comprising:
   (a) a quantity of gas generating material;
   (b) a housing comprising a top wall, a lower portion, and an outer side wall, defining an interior space therebetween, said outer side wall having a plurality of diffusion ports formed therein;
   (c) an inner side wall connected to said lower portion of said housing, said inner side wall being substantially concentric with said outer side wall, said inner side wall defining an ignition chamber therein for containing an igniter and a combustion chamber between said inner side wall and said outer side wall for containing said quantity of gas generating material, said inner side wall having a plurality of ignition ports formed therein;
   (d) a filter disposed in said combustion chamber proximate to the interior surface of said outer side wall, said filter being configured to entrap combustion residue from said gas generated in said housing before discharge of said gas;
   (e) a retainer disk disposed over said inner side wall proximate to said top wall of said housing, said retainer disk having a hollow collar portion formed therein configured to cooperate with said ignition tube; and
   (f) retaining means for positively locking said retainer disk to said inner side wall.

19. An inflator assembly as recited in claim 18, wherein said inner side wall comprises an ignition tube.

20. An inflator assembly as recited in claim 19, wherein said retaining means comprises:
   (a) a recess formed in said ignition tube; and
   (b) a plurality of indented features formed in said collar portion, at least a portion of each of said plurality of indented features being disposed in said recess in said ignition tube, thereby locking said retainer disk to said ignition tube.

21. An inflator assembly as recited in claim 20, wherein said plurality of indented features being configured such that upon a force parallel to the longitudinal axis of said ignition tube being applied to said retainer disk, each of said plurality of indented features deforming so as to be at least partially disposed in said recess formed in said ignition tube.

22. An inflator assembly as recited in claim 19, wherein:
   (a) said collar portion has a distal end; and
   (b) each of said plurality of indented features being at an angle relative to the longitudinal axis of said ignition tube such that said distal end of said collar portion at each of said plurality of indented features is proximate to said ignition tube.

23. An inflator assembly, as recited in claim 20, wherein said recess is formed in the outside surface of said ignition tube.

24. An inflator assembly as recited in claim 22, wherein said recess is a channel.

25. A housing as recited in claim 24, wherein:

(a) said filter has an outer surface adjacent an inside surface of said outer side wall, an upper lateral surface, and a lower later surface; and (b) said retainer disk being disposed proximate to at least a portion of said upper lateral surface of said filter and against said top wall for preventing blow by of generated gas around said filter.

26. A positive lock assembly for components of an air bag inflator assembly comprising:

(a) an ignition tube having a longitudinal axis, an inside surface, and an outside surface;

(b) a retainer disk having a hollow collar portion formed therein configured to cooperate with said ignition tube;

(c) a recess formed in said inside surface of said ignition tube; and (d) a plurality of indented features formed in said collar portion of said retainer disk, at least a portion of each of said plurality of indented features being disposed in said recess in said ignition tube, thereby positively locking said retainer disk to said ignition tube.

27. A housing for an air bag inflator assembly, comprising:

(a) a cover having a top wall and a downwardly extending outer side wall, said outer side wall having a plurality of diffuser ports formed therein;

(b) a base configured to cooperate with said cover to define an enclosed interior space therebetween;

(c) an inner side wall attached to said base, said inner side wall and said outer side wall defining a combustion chamber, said inner side wall defining an ignition chamber and having a plurality of ignition ports therein, said inner side wall having an open end, a lower end, and a recess formed therein;

(d) a filter disposed in said combustion chamber adjacent to the inner surface of said outer side wall; and (e) a retainer disk disposed over said inner side wall proximate to said top wall, said retainer disk having a hollow collar portion formed therein configured to cooperate with said inner side wall, said collar portion having a plurality of indented features formed therein configured to cooperate with said upper end of said inner side wall to positively lock said retainer disk and said inner side wall.

* * * * *